United States Patent [19]
Davis

[11] Patent Number: 5,606,936
[45] Date of Patent: Mar. 4, 1997

[54] ANIMAL RESTRAINING SYSTEM

[76] Inventor: James E. Davis, 26 Austin Rd., Wilmington, Del. 19810

[21] Appl. No.: 428,050

[22] Filed: Apr. 25, 1995

[51] Int. Cl.$^6$ .................................................... A01K 3/00
[52] U.S. Cl. .................................................... 119/721
[58] Field of Search ................................... 119/720, 721, 119/908

[56]        References Cited

U.S. PATENT DOCUMENTS 3,753,421  8/1973  Peck .
4,335,682  6/1983  Gonda et al. .
5,067,441  11/1991 Weinstein .
5,460,124  10/1995 Grimsley et al. .................... 119/721
5,465,687  11/1995 Custer ................................. 119/721 X Primary Examiner—Robert P. Swiatek

[57]             ABSTRACT

A low average power animal restraining system and method has a radio frequency transmitter for generating a carrier signal, an antenna for radiating the carrier signa, a radio frequency receiver, adapted to be placed on the animal. The receiver has an animal stimulation mechanism for providing a warning to the animal in response to a signal received from the transmitter. Power required to operate the transmitter is reduced by (1) amplitude modulating the carrier signal with a low frequency signal having a low duty cycle, (2) discontinuing the carrier signal for periods of time, or (3) reducing the pulse width of the carrier signal.

6 Claims, 3 Drawing Sheets

ANIMAL RESTRAINING SYSTEM

CROSS REFERENCE TO RELATED APPLICATIONS

This invention is related to an application Ser. No. 08/201,215 filed Mar. 21, 1994 entitled Animal Control System by James E. Davis and Bryon H. Rubin.

1. Field of the Invention

This invention relates to a system for restraining the movement of an animal relative to a region where the animal is to be restrained.

2. Background of the Invention

There are many occasions when the owners of small animals desire to prevent the animal from moving beyond a defined region or to prevent the animal from moving into such region. Devices of this type are available on the market and are often called an "electronic fence". Most applications are inclusionary, where the animal is kept within a region defined by a wire loop positioned about the perimeter of the region. A region can be exclusionary if the animal is outside the region defined by the wire loop.

One such system is disclosed by Peck (U.S. Pat. No. 3,753,421) in which a signal emitting wire antenna delineates an area with respect to which the animal can be included or excluded. The animal wears a receiver having a physical effect producer or similar animal stimulation mechanism on a collar. The signal emitted by the antenna wire typically is a modulated alternating current in the sub-broadcast band. Most systems use a radio frequency (rf) carrier of 7–10 kilohertz (KHz) gated on and off by a modulating audio signal of 10–40 hertz (Hz). The audio modulation allows a receiver to avoid false signals as might emanate from a television set or other noise.

Unfortunately systems of this type are not readily suitable for "excluding" the animal from a region or area, particularly small or movable regions or areas. Firstly the systems require a wire loop antenna which would be difficult to utilize to exclude pets from movable objects such as beds, tables, chairs, sofa, and the like. Another known system is described by Weinstein (U.S. Pat. No. 5,067,441) who uses multiple antennas of the magnetic loop (ferrite core) variety. The transmitting loop is a central antenna which produces a radiation lobe characterizing the area in which the animal is to be constrained as contrasted to the wire perimeter type loop of the prior art. This eliminates the need for the wire loop antenna but still is not suitable for keeping animals out of a defined region.

Most of the prior systems require relatively high power and typically would quickly drain any battery used to operate them. They generally require power supplied from the electric mains.

An animal training apparatus is described by Gonda and Vancza (U.S. PAT. No. 4,335,682). This device uses a receiver mounted to a collar that provides different animal stimuli based on the received tone (i.e., the audio modulation of the RF carrier). Here again the system requires relatively high power to operate and although based upon a battery operated transmitter. In this, however, transmitter usage is only intermittent as operated from time to time by the trainer only when actively training the dog. Otherwise the system would require power from the electric mains or suffer short battery life.

Other commercial transmitters of the prior art have permitted battery operation, however the power consumption is substantial. Thus the battery is required to be large and it would be difficult to hide the transmitter and battery, for example, in a sofa or other similar item of furniture.

It is noted it is difficult to install a wire loop antenna in any item of furniture without destroying the appearance of the furniture. It is also difficult with respect to such movable items to supply them with suitable AC power as from a house outlet.

SUMMARY OF THE INVENTION

The animal restraining method and system, and particularly the transmitter of this invention, overcomes many of the deficiencies of the conventional animal control system transmitters of the prior art. The method and systems are particularly useful for excluding animals from areas. This invention provides a low average power animal restraining system comprising:

(a) a radio frequency transmitter having means for generating a radio frequency carrier signal in a region where the animal is to be controlled; the transmitter having means to amplitude modulate the carrier signal with a low frequency square wave signal having a low duty cycle, thereby to decrease the transmitter's average power requirements;

(b) a transmitting antenna coupled to the transmitter for radiating such radio frequency signals;

(c) a radio frequency receiver adapted to be placed on the animal for receiving such radiated signals, and
  (i) the receiver having an animal stimulation means for providing a warning to the animal in response to the received radiated signal.

In a preferred embodiment the transmitter includes means to discontinue for periods of time the generation of the modulated carrier signals, thereby to decrease the average transmitter power requirements. In still another preferred embodiment of this invention, the transmitter has means to control the pulse width of the carrier signal to shorten the carrier signal duty cycle, thereby decreasing the transmitter's power requirements when the range of radiated signal can be decreased.

This invention also provides a low average power animal restraining system comprising a carrier generator for generating square wave signals at a radio frequency, a pulse width controller coupled to the output of the carrier generator to reduce the period of each square wave signal, an audio generator for generating an audio square wave signal, at an audio frequency "a" having a controlled duty cycle, means for coupling the audio to modulate the carrier generator with each audio square wave signal, and an antenna having a resonant circuit coupled to the output of the pulse width controller, for radiating modulated carrier frequency signals.

This invention also provides a method for controlling animals comprising the steps of: (a) generating a radio frequency carrier signal in a region where the animal is to be controlled; (b) radiating such carrier signal; (c) placing a radio frequency receiver on an animal for receiving such radiated signal; the receiver having an animal activation means for providing a warning to the animal in response to the received radiated signal; and (d) pulse width controlling the carrier signal to have a low duty cycle thereby to reduce the average power requirements of radiating the carrier signal. The carrier signal may be amplitude modulated with a controlled duty cycle audio.

This invention makes it convenient to hide the RF transmitter, for example, in a sofa or other movable object, because the circuitry requires only low power and the battery may be compact. The battery has good life because of the power conserving features of this invention, namely a carrier level adjustment that reduces power consumption when the full range is not required, a reduction of the duty cycle of the audio modulation, and the use of an operation mode where the transmitter is gated on periodically for a short period sufficient to sustain the animal behavior.

DESCRIPTION OF THE DRAWINGS

The following description of this invention will be better understood when read in conjunction with the accompanying drawings in which like reference numerals refer to like objects and in which.

DETAILED DESCRIPTION OF THE PREFERRED EMBODIMENT

Figure 1:
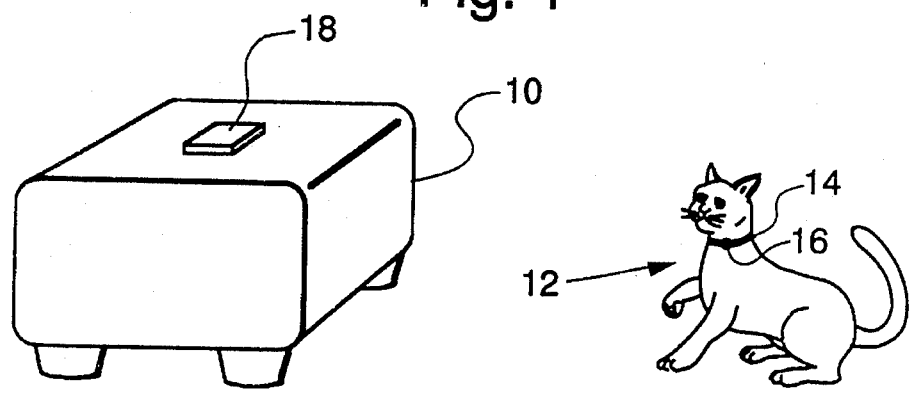
FIG. 1 is a pictorial view of the animal restraining system of this invention.

The low power animal restraining system of this invention is best seen in FIG. 1 in which a region or area to be protected, in this case depicted by a piece of household furniture such as a stool 10. The stool 10 has a transmitter or generator 18 positioned thereon capable of sending radio frequency (RF) signals and generally below 1 megahertz (1 MHz) preferably in the sub-broadcast range, typically about 550 kilohertz (550 $KH_z$) and generally below 100 megahertz (100 MHz). The transmitter 18 may have a ferrite core antenna (not shown) to make the unit compact and the transmitter is battery operated. The transmitter 18 includes means to adjust or control to reduce the width (of the waveform) of the carrier signal so that it has a lower duty cycle, as will be described, together with means to amplitude modulate the carrier signal with a low frequency signal, preferably an audio frequency square wave, having a low duty cycle. The transmitter as will be described may also include means to gate (100% amplitude modulate) the transmitter on and off or discontinue the transmitter operation at periods so as to decrease the average power consumption by the transmitter, without decreasing its effectiveness.

These features permit the use of a transmitter that consumes relatively low average power and hence may be operated over extended periods of time with a simple battery rather than having to use an AC power outlet.

These transmitter signals are radiated by the transmitting antenna (not shown) on the transmitter 18 of FIG. 1. The animal in this case is depicted as a cat 12 which has a RF receiver 16 mounted on a collar 14 positioned around the animal's neck. The receiver may be totally conventional and capable of demodulating the received radiated signals from the transmitter and providing the usual known warning signal or stimulating means such as a noise or electrical shock to the animal when the animal approaches too closely the region to be protected.

Figure 2:
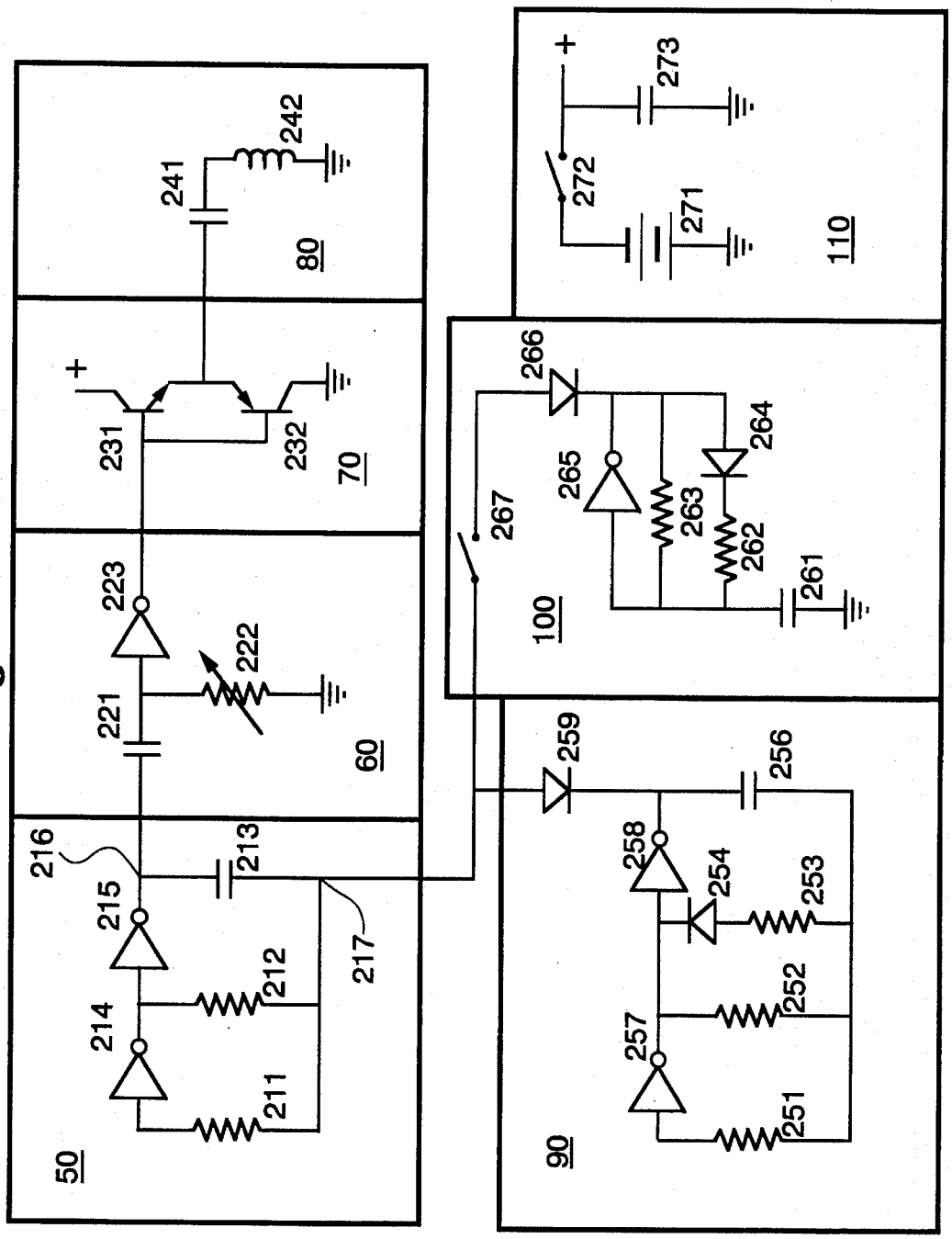
FIG. 2 is a schematic diagram of the transmitter depicted in FIG. 1 which is used in accordance with this invention.

The transmitter 18 is most clearly seen in the schematic diagram of FIG. 2 and preferably is a square wave generator using integrated circuits. The transmitter includes a carrier generator 50 capable of generating a square wave signal in the sub-broadcast range, a pulse width controller circuit 60 for shortening the width or duty cycle of the square wave, a power amplifier 70 coupled to the output of the pulse width controller 60 and a resonant antenna 80 coupled at the output of the power amplifier 70 for radiating such radio frequency signals.

The transmitter also includes a low frequency oscillator, preferably audio generator 90 with a controlled (by selection of circuit elements) duty cycle for modulating the carrier generator 50 and a cycle generator 100 for periodically gating the carrier generator 50 on and off, thereby to reduce the average power consumed by the transmitter. The transmitter finally includes a power supply 110 as will be described.

Carrier generator 50 preferably is an astable multivibrator that uses two COS/MOS inverters in, for example, a standard CMOS integrated circuit part such as the CD4069B or CD40106B.

Referring to FIG. 2, the carrier generator 50 is seen to include an astable multivibrator having first and second inverters 214 and 215 connected in series. The output 216 of the second inverter 215 is connected through a capacitor 213 to the junction 217 between two serially connected resistors 211 and 212 which are connected in series between the output and the input of the inverter 214.

The circuit 60 for shortening or controlling the pulse width of the square waves of the carrier generator 50, comprises a capacitor 221 connected between the output 216 of the carrier generator 50 and the series connected resistor 222 to ground. The junction between the capacitor 221 and resistor 222 is connected through a Schmitt trigger 223, which may be one of the six Schmitt triggers in a standard CMOS integrated circuit part such as the CD40106B. Each circuit functions as an inverter with Schmitt trigger action on the input. The trigger switch is at different points for positive and negative going signals.

The output of the Schmitt trigger 223 is connected to power amplifier 70 which comprises a complementary emitter follower comprising an NPN transistor 231 and a PNP transistor 232. The output of the power amplifier, taken from the common emitters of the transistors 231 and 232, is coupled through a series resonant circuit comprising a capacitor 241 and inductor 242 which comprises the antenna 80 for radiating the radio frequency generated. The series resonant circuit 80 draws significant power only at the resonant frequency and not at the harmonic frequencies also contained in the square wave carrier from the power amplifier 70.

The generator or transmitter of FIG. 2 also includes an audio generator 90 which is a square wave generating circuit similar to the circuit used in the carrier generator 50. It also may be an COS/MOS integrated circuit such as the CD4069B or CD40106B which is an astable multivibrator having series connected inverter gates 257 and 258. Resistors 251 and 252 are connected in series between the input and the output of the inverter 257. The resistor 252 has a parallel connected series connected resistor 253 and diode 254 for the purpose of controlling the duty cycle. Finally the output of inverter 258 is connected through a capacitor 256 to the junction between the resistors 251 and 252. The output of the inverter 258 is also connected through the cathode side of a diode 259 to the carrier generator 50 at the junction 217 for the purpose of modulating or gating the RF carrier.

The transmitter of FIG. 2 also includes an astable oscillator or cycle generator 100 for providing the necessary signals to turn off or cause the carrier generator to discontinue oscillation to reduce transmitter power as described. The discontinue means or cycle generator is connected to the junction 217 on the carrier generator 50 and is connected through a switch 267 and thence through a diode 266 to the output of an inverter 265 which may be one of the inverters of the standard CMOS integrated circuit part such as the CD40106B. A resistor 263 is connected between the input and output of the inverter 265 and in turn the resistor 263 is parallelled by a series connected diode 264 and resistor 263 for the purpose of controlling the on and off times. The input of the inverter 265 is connected through a capacitor 261 to ground.

Figure 3:
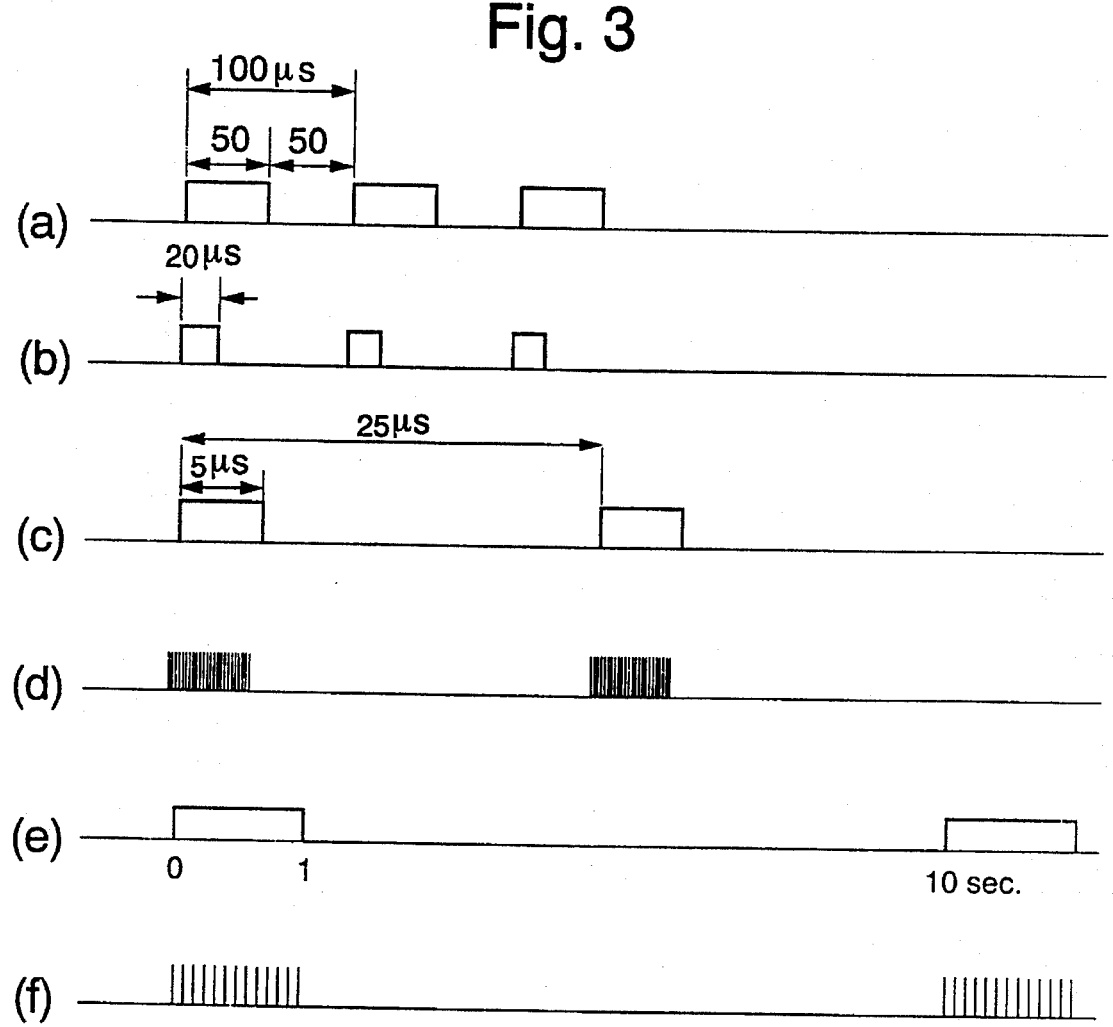
FIG. 3 is a representation of the signals used within the transmitter to reduce the power requirements.

Finally the transmitter of FIG. 3 includes a power supply 110 which includes a battery 271 whose negative terminal is connected to ground and positive terminal is connected to a switch 272 to the positive voltages for the power supply and thence through a capacitor 273 to ground.

In the operation of the carrier generator 50, assume the output of the inverter 215 has just gone high, meaning toward the positive voltage. The capacitor 213 will pull the input of inverting gate 214 high through resistor 211, whose purpose is to limit current in the static protection elements (not shown) internal to inverter 214. The output of inverter 214 goes low and through the connection to the input of inverter 215, maintains the output of inverter 215 high. The resistor 212 draws current from capacitor 213. Since the output of inverter 214 was low, junction 217 is drawn low over time as the capacitor charges, eventually dropping below the threshold voltage of the input of inverter 214. At this point the output of inverter 214 switches high and consequently the output of inverter 215 switches low and a second half-cycle of charging capacitor 213 commences. The switching between high and low continues so long as junction 217 is free to float. The oscillation is inhibited whenever diode 259 or diode 266 conducts, pulling the voltage at junction 217 low. When the conduction of both diodes is terminated, resistor 212 will begin pulling the voltage at junction 217 high, eventually reaching the threshold of inverter 214 whereupon oscillation will commence. Thus the output of the carrier generator 216 is depicted in FIG. 3 by the square wave form (a) which is a series of positive pulses. If the circuit components 212 and 213 are selected properly to provide a RF frequency in the subbroadcast range of 10 KHz, the period of the pulses is 100 microseconds, each positive portion of the square wave being 50 microseconds yielding, for example, a 50% duty cycle.

In accordance with this invention, the power required to radiate the carrier signal is reduced several ways. Firstly, the pulse width controller 60 which reduces the duty cycle of the pulses, i.e., the carrier signal, generated by the carrier generator 50. By narrowing the width of the pulses, the pulse width controlling or adjusting circuit operation may be understood by assuming the output of an inverter 215 has just gone high, whereupon the output of the inverter 223 of the pulse width controller drops low. The time required to drag the voltage to the threshold can be decreased by reducing the resistance of the resistor 222. When the output of the inverter 216 drops low, the voltage at the input to inverter 223 swings even further below the threshold so there will be no change in the output of inverter 223 until the next carrier cycle. It is preferred that the inverter be a Schmitt trigger of the type described above so that the output switches state abruptly without lingering in the high dissipation state where the upper and lower output transistors internal to the integrated circuit are both on.

The effect of the pulse width controller 60 is depicted in waveform (b) of FIG. 3 assuming the 10 KHz basic carrier frequency. If the pulse width is decreased to have a 20% duty cycle for the carrier frequency, the period of each carrier pulse will be 20 microseconds relative to the carrier generator period of 100 microseconds.

The power amplifier functions in a normal manner and couples the pulse width controlled signal from the carrier generator to the antenna which has the tuned LC circuit. The capacitor 241 and inductor 242 are chosen so that the resulting impedance presents a load to the power amplifier that draws the desired amount of power. The inductor 242 may be an unshielded ferrite or iron core coil or may be a plain coil of wire. The radiated electric field will be dipolar and the conjugate magnetic field will be toroidal. The coil might be external to the rest of the transmitter circuitry, although it is most convenient to the user if the transmitter is totally self contained.

The audio generator 90 resistor and capacitor values are adjusted to provide an RC time constant such that the oscillation occurs at a lower frequency than the carrier generator 50. When capacitor 256 is pulling resistor 251 and 252 high, the diode 254 conducts so that the additional current through resistor 253 will charge the capacitor faster than resistor 252 alone. Inverters 257 and 258 provide the signal inversions. When the output of the gate inverter 258 is low, the operation of the carrier generator 50 is inhibited by the current through diode 259. The output of the audio generator 90 is depicted by the square wave form (c) in FIG. 3 which illustrates an audio frequency of 40 Hertz (Hz). Such frequency has a period of 25 milliseconds.

The duty cycle is changed in accordance with this invention, by the operation of the resistor 253 and diode 254 in which, as described above, the diode conducts so that the current through the resistor 253 charges capacitor faster than resistor 252 alone. This provides in an assumed case illustrated by the waveform (c), a reduced duty cycle of, e.g., only 20% for an audio frequency of 40 Hz, the entire cycle being 25 milliseconds and the square wave pulse being on for only 5 milliseconds of that period. When the output of the audio generator, the inverter 258, is low, the RF carrier 50 is stopped. Hence the audio generator provides a signal as depicted by the waveform (c) which is high during which time the carrier generator oscillates. This provides, as depicted in waveform (d), the audio modulated carrier having periodic pulses or bursts of the carrier such that the carrier is "on" 20% of the time.

Recall that because of the operation of the pulse width controller, the carrier frequency signal itself is only operating at a 50% duty cycle or less. The audio gating of the RF carrier may occur at any convenient point up to the power amplifier output. Prior to the power amplifier, the circuits work at microamp currents and are a minimal drain on the battery. Thus alternatively to that shown, the RF oscillator may be designed to oscillate continuously and the gating applied subsequently.

The relaxation oscillator circuit of the cycle generator 100, which further reduces transmitter power, is best understood by supposing the output of the inverter 265 has just gone high. Current through resistor 263 and diode 264 and resistor 262 will pull the voltage on capacitor 261 high until the voltage exceeds the threshold of the input of inverter 265. At that time, the output of 265 will swing low and resistor 263 will discharge the voltage on capacitor 261 at a slower rate since diode 264 and resistor 262 do not conduct current. Thus the output of gate 265 will be low longer than it will be high. It is during this low period that the carrier generator is stopped by the current drawn through diode 266. During the low period, diode 266 pulls the junction 217 low and inhibits the carrier oscillator, provided switch 267 is closed. When switch 267 is open, the carrier will be on continuously, except as modulated by the audio generator, and will consume more battery power. The cycle generator could be an astable oscillator circuit like that of the audio generator, which gives better frequency stability. However, the circuit shown is preferred because it uses only one gate and the other gates of the hex Schmitt trigger CD40106 were committed. If the cycle generator is assumed to have a frequency of 0.1 Hz, the carrier generator may be operated with a 10% duty cycle of the cycle generator such that with a period of 10 seconds, the carrier generator is gated on only during a period of 1 second, as seen in the waveform (e). Under these conditions, the transmitter output, occurring at the 10 KHz rate, is only "on" during the period indicated in waveform (f), each "spike" indicating a series of high frequency RF carrier pulses as modulated by the audio signal.

Described another way, the output signal to the power amplifier may be considered as a combination of (1) the pulse width controlled carrier signal, (2) the audio modulated carrier signal, and (3) the cycle controlled audio modulated carrier signal to provide packets or clusters (each spike in waveform f) of RF. Each packet lasts for 1 second and is repeated every 10 seconds. Within each packet are bursts of RF. Each burst lasts for 5 m.sec and reoccurs each 25 m.sec. These three factors acting to reduce the average power required for the carrier signal result in a significant power saving, yet each burst of RF is of sufficient instantaneous power to activate the receiver.

Duty cycle is either the time interval occupied by a device, e.g., a modulating signal or a carrier signal, on intermittent duty in running or the ratio of this time interval to the total time of one operating cycle. In the claims, signals having low, short or shortened duty cycles are described as having a "reduced" duty cycle. The duty cycle is considered reduced in this invention when it is less than fifty (50%) percent.

The power supply as described above could be attached to a household electric main but it is preferable that the battery indicated be used which is practical because of the low average power drain provided by the novel system of this invention.

Figure 4:
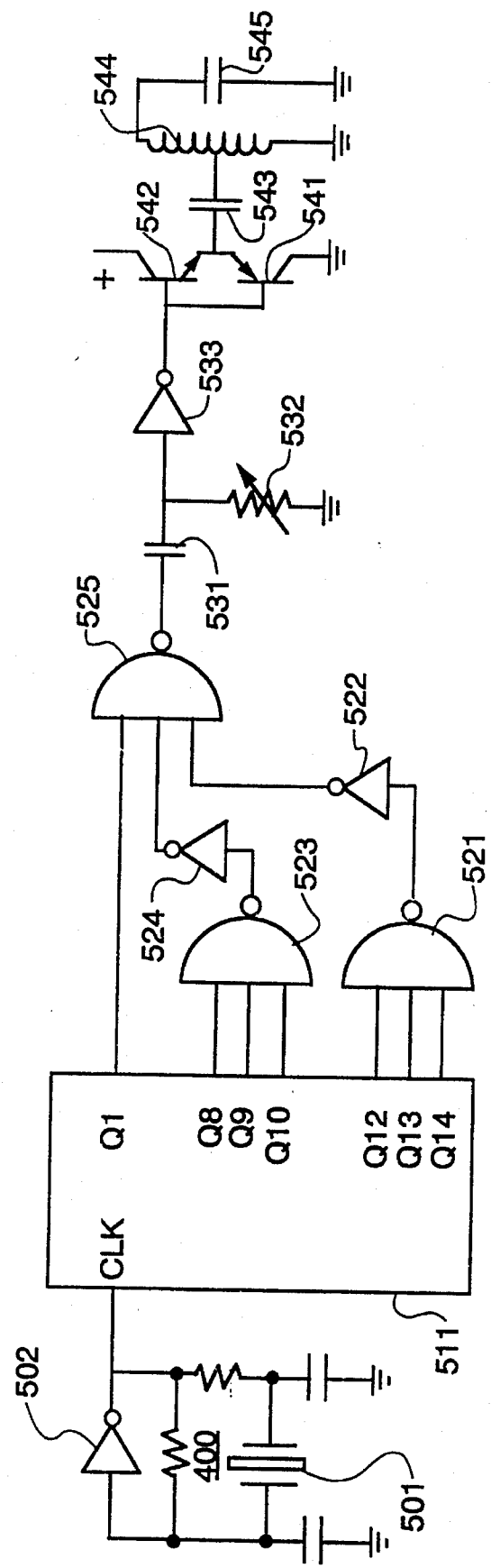
FIG. 4 is a schematic diagram of a digital version of the transmitter depicted in FIG. 1 which may be used in accordance with this invention.

FIG. 4 shows a digital implementation of the generator or transmitter 18 (FIG. 1) of the subject invention. It includes a crystal controlled oscillator 400. The output of the oscillator 400, coupled to the clock input of a conventional frequency divider circuit 511 having a plurality of different frequency outputs designated by the symbols Q1, Q8, Q9, Q10, Q12, Q13 and Q14. These outputs are connected respectively to various NAND gates 521,523 and 525 which may each be one gate of a standard CMOS integrated circuit CD4023B. The outputs of the integrated circuits 521 and 523 are connected through inverters 522 and 524 to the input along with the Q1 output of the integrated circuit 511 to the integrated circuit 525. As will be described, the output of the integrated circuit 521 provides a "cycle" signal. The integrated circuit 523 provides an "audio" signal and the output of the Q1 output of the integrated circuit 511 provides the RF carrier frequency.

Integrated circuit 525 logically combines the RF carrier, audio signal, and cycle signal to provide packets of the carrier frequency. This same was described with respect to the transmitter illustrated in FIG. 2.

The output of the integrated circuit 525 is connected to the pulse width adjuster, similar to 60 of FIG. 2, comprising capacitor 531, resistor 532 and Schmitt trigger 533 to affect the duty cycle of the RF carrier which subsequently affects the power delivered to the antenna. The output of pulse width adjuster is connected to the power amplifier transistors 541 and 542 which in turn is connected to the resonant antenna comprising capacitors 543 and 545 and tapped inductor 544. The portion of the inductor connected to the capacitor 545 serves to circulate some of the resonant energy, thereby improving efficiency. The efficiency is improved because the circulating resonant current would otherwise all pass through the power amplifier, resulting in conduction losses, i.e., heat.

Returning to description of the oscillator 400, it may be seen to comprise an inverter gate 502 and a crystal 501 constructed according to the customary practices as described in an application note ICAN-6086 entitled "Time Keeping Advances Through COS/MOS Technology" issued by Radio Corp. of America. A 20 KHz crystal was used and the 20 KHz square wave from the output of gate 502 is connected to the clock input of the integrated circuit 511 which may be a CD4020B. The output Q1 of the first binary divider stage of integrated circuit 511 provides an RF carrier, in the form of a square wave having a frequency of 10 kHz and a duty cycle of 50% and is connected to one input of a three-input NAND gate 525 (which may be one gate of an integrated circuit CD 4023B). The output of the tenth binary divider stage of integrated circuit 511, Q10, is a square wave audio signal of a nominally 40 Hz (more exactly 20 KHz÷$2^{10}$). The other inputs of the integrated circuits 523 are connected to binary divider stages Q8 and Q9 of integrated circuit 511. Outputs Q8, Q9 and Q10 are all high ⅛ of the time and the output of the integrated circuit 523 will be low ⅛ of the time. Thus the square wave audio is generated to have a duty cycle of 12.5%. Other duty cycle values may be had by different logical combinations of the binary divider outputs. The output of the integrated circuit 523 is inverted by integrated circuit 524, the output of which is connected to an input of integrated circuit 525.

In similar fashion, outputs Q12, Q13 and Q14 of the frequency divider 511 are connected to integrated circuit 521 (which may be one gate of the CD4023B) to generate a cycle "signal" having an "on" time of approximately 0.1 seconds (more exactly 50% duty cycle multiplied by $2^{12}$ multiplied by the oscillator period, 50 microseconds, for a 20 KHz crystal). The period of the cycle timer is 8× the "on" time or 0.8 seconds, thus representing a duty cycle of 12.5%. The output of the integrated circuit 521 is inverted by gate 522 and connected to a third input of the integrated circuit 525. The operation of the integrated circuit 525 is previously described as providing packets of the radio frequency signal. Each packet lasts for approximately 0.1 seconds and is repeated every 0.8 seconds according to the characteristics of the cycle signal. Within each packet are bursts of radio frequency. Each burst lasts for about 3 milliseconds (12.5% of 1/40 seconds). The combined effect of the reduction of the audio duty cycle from 50% to 12.5% and the 12.5% duty cycle of the cycle signal is to reduce the average power consumed by 32 while still providing a protective zone for the animal.

Any duty cycle signal used herein may be generated through logical combinations of signals from a binary divider. Table 1 shows how logical combinations of three signals from a binary divider chain produce duty cycles in increments of 12.5% (of course 0 and 100% can be had but they are uninteresting DC).

TABLE 1

| Duty Cycle (%) | Logical Combination |
| --- | --- |
| 12.5 | QC and QB and QA |
| 25 | QC and QB |
| 37.5 | QC and (QB or QA) |
| 50 | QC |
| 62.5 | QC or (QB and QA) |
| 75 | QC or QB |
| 87.5 | QC or QB or QA | where QA is the output of a first stage of a binary divider, QB is the next stage and QC is the third stage. Other increment sizes may be had with more or less stages from the binary divier.

The analog duty cycle controller 60 may be replaced with digital circuitry. The amplitude of the fundamental RF signal after filtering out the harmonics is given by M. E. Van Valkenburg (*Network Analysis* 2nd ed. Prentice-Hall Inc., Englewood Cliffs, N.J. c 1964 pg. 438–9) as the Fourier coefficient of a periodic pulse. The relative amplitude of the fundamental RF signal is:

$$C_1' = C_1 \sin(\alpha P / 100\%)$$

where $\alpha$ is the percent duty cycle and $C_1$ is the coefficient of a squarewave (i.e., 50% duty cycle)

While the signal amplitude is not a linear function of the duty cycle, all amplitude levels may be achieved. A 25% duty cycle RF signal (a relative RF amplitude of 0.707) may be produced as a logical combination of the signals from the binary divider chain as (QC and QB). The following notation prevails, Q1 is 10 KHz (as described for FIG. 4) and is equivalent to QC of the table. QO is 20 KHz and is equivalent to QB.

Low average power and high efficiency may be achieved with variations of the principles just described. For example, an additional integrated circuit binary frequency dividers could be added to follow the integrated circuit 511, the output of which could be logically combined to give longer cycle periods—more complex sequences might give short packets to conserve power but occasionally, say every 50 seconds, give a long packet sufficient to overcome time delays of an electric shocker in the receiver on the animal. This kind of sequence would maintain the animal's respect for the electronic fence. The crystal oscillator could be replaced with an astable oscillator described for the analog version of this invention. The duty cycle of the RF carrier could be effected by increasing the oscillator frequency and logically combining the outputs of the first couple of binary dividers in a fashion similar to that described for the audio and cycle signal. Of course the various integrated circuits could be combined into a single custom integrated circuit.

What is claimed is:

1. A low average power animal restraining system comprising:

a carrier generator for generating a square wave signal at a radio frequency, a pulse width controller coupled to the output of the carrier generator to reduce the duty cycle of the square wave signal, an audio generator for generating an audio square wave signal, at an audio frequency "a" having a reduced duty cycle, means for coupling the audio generator to modulate the carrier generator with the audio square wave signal, a cycle generator for generating a square wave signal of a frequency less than "a", having a reduced duty cycle, means coupling the cycle generator to disable the carrier generator square wave during each cycle generator square wave, an antenna having a resonant circuit coupled to the output of the pulse width controller, for radiating the modulated carrier frequency signal, and a receiver adapted to receive the radiated signal.

2. A method for restraining animals comprising the steps of:

(a) generating a radio frequency carrier signal in a region where the animal is to be restrained, (b) pulse width controlling the carrier signal to reduce its duty cycle, thereby to reduce the average power requirements of radiating the carrier signal, (c) modulating the carrier signal with a square wave audio frequency signal "f" having a reduced duty cycle, thereby to further reduce the average power requirements of radiating the modulated carrier signal, (d) further modulating the carrier signal with a square wave cycle signal of a frequency less than "f", the square wave cycle signal having a reduced duty cycle, thereby to further reduce the average power requirements of radiating the modulated carrier signal, (e) radiating such modulated carrier signal; and (f) placing a radio frequency receiver on an animal for receiving such radiated signal, the receiver having an animal activation means for providing a warning to the animal in response to the received radiated signal.

3. A low average power animal control system comprising:

(a) a radio frequency transmitter having means for generating a radio frequency carrier signal in a region where an animal is to be controlled, the transmitter having means to amplitude modulate the carrier signal with a low frequency square wave signal having a low duty cycle, thereby to decrease the transmitter's power requirements, (b) a transmitting antenna coupled to the transmitter for radiating such radio frequency signals, (c) a radio frequency receiver for receiving such radiated signals, adapted to be placed on the animal, (i) the receiver having an animal stimulation means for providing a warning to the animal in response to the received radiated signal, the means for generating the radio frequency carrier signal being a first astable multivibrator integrated circuit having an input and output, said multivibrator comprising first and second inverters each having an input and output connected in series between the input of the second inverter and output of the first inverter, first and second resistors connected in series between the input and output of the first inverter and a capacitor connected from the output of the second inverter to the junction of the first and second resistors.

4. The system set forth in claim 3 wherein the means to modulate the carrier signal with a low frequency signal comprises a second astable multivibrator integrated circuit, said comprising third and fourth inverters each having an input and output connected in series between the input of the fourth inverter and output of the third inverter, third and fourth resistors connected in series between the input and output of the third inverter and a capacitor connected between the output of the fourth inverter and the junction of the third and fourth resistors, and a resistor and a diode connected in series between the output of the third inverter and the junction of the third and fourth resistors.

5. A low average power animal restraining system comprising:

a carrier generator for generating a square wave signal at a radio frequency, an audio generator for generating an audio square wave signal at an audio frequency "a" having a reduced duty cycle, means for coupling the audio generator to modulate the square wave radio frequency signal with said audio square wave signal, a cycle generator for generating a square wave signal of a frequency less than "a", having a reduced duty cycle, means for coupling the cycle generator to discontinue the modulated carrier frequency signal, an antenna having a resonant circuit for radiating the modulated carrier frequency signal, and a receiver adapted to receive the radiated signal.

6. The system of claim 5 where the square wave signal at a radio frequency is reduced in pulse width to reduce the strength of the radiated signal and to efficiently reduce the average power requirements of radiating the carrier signal.

* * * * *